(12) United States Patent
Liu et al.

(10) Patent No.: US 12,263,635 B2
(45) Date of Patent: Apr. 1, 2025

(54) METHOD AND SYSTEM FOR PREPARING CATHODE MATERIAL

(71) Applicant: WUHAN UNITED IMAGING HEALTHCARE CO., LTD., Hubei (CN)

(72) Inventors: Sang Liu, Wuhan (CN); Guang Yang, Wuhan (CN); Xi Zhang, Shanghai (CN)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 176 days.

(21) Appl. No.: 17/933,079

(22) Filed: Sep. 16, 2022

(65) Prior Publication Data

US 2023/0085306 A1    Mar. 16, 2023

(30) Foreign Application Priority Data

Sep. 16, 2021   (CN) .......................... 202111089324.3

(51) Int. Cl.
   *B22F 10/28*   (2021.01)
   *B22F 10/36*   (2021.01)
   (Continued)

(52) U.S. Cl.
   CPC ............ *B29C 64/153* (2017.08); *B29C 64/30* (2017.08); *B29C 71/02* (2013.01); *B33Y 10/00* (2014.12);
   (Continued)

(58) Field of Classification Search
   CPC ........ B22F 10/28; B22F 10/36; B22F 10/366; B22F 10/368; B22F 10/60; B22F 10/64;
   (Continued)

(56) References Cited

U.S. PATENT DOCUMENTS

| | | | |
|---|---|---|---|
| 3,284,657 A | | 11/1966 | Weissman |
| 5,753,171 A | * | 5/1998 | Serbin ................... B33Y 10/00 |
| | | | 264/497 X |

(Continued)

FOREIGN PATENT DOCUMENTS

| | | |
|---|---|---|
| CN | 103406666 A | 11/2013 |
| CN | 108907214 A | 11/2018 |

(Continued)

OTHER PUBLICATIONS

Translation of CN 108907214 A (published on Nov. 30, 2018).*

(Continued)

*Primary Examiner* — Leo B Tentoni
(74) *Attorney, Agent, or Firm* — METIS IP LLC

(57) ABSTRACT

Embodiments of the present disclosure provides methods and systems for preparing a cathode component. The method may include obtaining a three-dimensional (3D) model of the cathode component; obtaining a predetermined parameter, wherein the predetermined parameter includes at least one of a scanning direction of laser, an energy distribution of laser, an output power of laser, or a scanning speed of laser; and controlling a 3D printer to perform, based on the 3D model and the predetermined parameter, a laser scanning on a raw material to obtain the cathode component.

20 Claims, 10 Drawing Sheets

(51) Int. Cl.
  *B22F 10/366* (2021.01)
  *B22F 10/368* (2021.01)
  *B22F 10/60* (2021.01)
  *B22F 10/64* (2021.01)
  *B22F 10/66* (2021.01)
  *B22F 10/85* (2021.01)
  *B22F 12/41* (2021.01)
  *B22F 12/46* (2021.01)
  *B22F 12/47* (2021.01)
  *B22F 12/90* (2021.01)
  *B29C 64/153* (2017.01)
  *B29C 64/268* (2017.01)
  *B29C 64/30* (2017.01)
  *B29C 64/393* (2017.01)
  *B29C 71/02* (2006.01)
  *B33Y 10/00* (2015.01)
  *B33Y 30/00* (2015.01)
  *B33Y 40/20* (2020.01)
  *B33Y 50/02* (2015.01)
  *B33Y 80/00* (2015.01)
  *H01J 9/02* (2006.01)
  *H01J 35/06* (2006.01)
  *B29L 31/34* (2006.01)
  *H01J 9/04* (2006.01)

(52) U.S. Cl.
  CPC ............... *B33Y 30/00* (2014.12); *B33Y 40/20* (2020.01); *B33Y 80/00* (2014.12); *H01J 9/02* (2013.01); *H01J 35/064* (2019.05); *B29L 2031/3406* (2013.01); *H01J 9/042* (2013.01); *H01J 2209/02* (2013.01); *H01J 2893/0022* (2013.01)

(58) Field of Classification Search
  CPC .......... B22F 10/66; B22F 10/80; B22F 10/85; B22F 12/41; B22F 12/46; B22F 12/47; B22F 12/90; B29C 64/153; B29C 64/268; B29C 64/386; B29C 64/393; B29C 71/02; B29L 2031/3406; B33Y 10/00; B33Y 30/00; B33Y 50/00; B33Y 50/02; H01J 9/02; H01J 9/04; H01J 9/042; H01J 35/06; H01J 35/064; H01J 2209/02; H01J 2893/0022

USPC .............. 264/51, 54, 162, 497; 425/78, 135, 425/174.4, 375; 219/121.61, 121.65, 219/121.66, 121.78, 121.85; 445/46, 51
  See application file for complete search history.

(56) References Cited

U.S. PATENT DOCUMENTS

| | | | |
|---|---|---|---|
| 8,183,756 B2 | 5/2012 | Terletska et al. | |
| 2011/0311389 A1* | 12/2011 | Ryan | F01D 5/18 419/27 |
| 2013/0338421 A1* | 12/2013 | Edlinger | C10J 3/22 588/320 |
| 2015/0048064 A1* | 2/2015 | Cheverton | B22F 10/28 219/121.64 |
| 2015/0270089 A1 | 9/2015 | Ghanea-Hercock | |
| 2017/0072471 A1 | 3/2017 | Welch et al. | |

FOREIGN PATENT DOCUMENTS

| | | | | |
|---|---|---|---|---|
| CN | 111036914 A | | 4/2020 | |
| CN | 112635275 A | | 4/2021 | |
| EP | 3170648 A1 | * | 5/2017 | ............ B22F 10/366 |
| JP | 2003253365 A | * | 9/2003 | ............... B21B 1/40 |
| JP | 2019084723 A | | 6/2019 | |

OTHER PUBLICATIONS

Translation of JP 2003253365 A (published on Sep. 10, 2003).*
Translation of EP 3170648 A1 (published on May 24, 2017).*
Qiao, Yingjie et al., Material Synthesis and Preparation, National Defense Industry Press, 2010, 9 pages.
Science and Technology Exchange Office, Shanghai Jiao Tong University, Abstracts of Papers from the Academic Conference on the 87th Anniversary of Shanghai Jiao Tong University, Materials Science and Engineering Album, 1896-1983, 7 pages, (1983).
The Extended European Search Report in European Application No. 22196215.2 mailed on Jan. 26, 2023, 9 pages.
Salomé Sanchez et al., Multi-laser Scan Strategies for Enhancing Creep Performance in LPBF, Additive Manufacturing, 2021, 15 pages.

* cited by examiner

METHOD AND SYSTEM FOR PREPARING CATHODE MATERIAL

CROSS-REFERENCE TO RELATED APPLICATIONS

This application claims priority to Chinese Patent Application No. 202111089324.3, filed on Sep. 16, 2021, the contents of which are incorporated herein by reference in their entirety.

TECHNICAL FIELD

The present disclosure relates to the field of a cathode component, in particular, to methods and systems for preparing a cathode component.

BACKGROUND

X-rays are widely used in various fields, such as medical diagnosis and treatment, security inspection, industrial flaw detection, or the like. The quality of a cathode component of a tube of X-ray has an important influence on generation and intensity of X-rays. Existing preparation process of the cathode components is quite complicated. Therefore, it is necessary to provide methods and systems for preparing the cathode component, to simplify a preparation process of the cathode component and improve the quality of the cathode component.

SUMMARY

One aspect of the present disclosure may provide a method for preparing a cathode component. The method may include: obtaining a three-dimensional (3D) model of the cathode component; obtaining a predetermined parameter, wherein the predetermined parameter includes at least one of a scanning direction of laser, an energy distribution of laser, an output power of laser, or a scanning speed of laser; and controlling a 3D printer to perform, based on the 3D model and the predetermined parameter, a laser scanning on a raw material to obtain the cathode component.

In some embodiments, the scanning direction of laser may be perpendicular to a long axis direction of the cathode component.

In some embodiments, the energy distribution of laser may be a flat-top distribution.

In some embodiments, the cathode component may be processed by at least one of heat treating, cold working, or polishing.

In some embodiments, a plurality of holes may be distributed inside the cathode component.

In some embodiments, a porosity of the cathode component may be not greater than 20%.

In some embodiments, a length of a crystal grain of the cathode component may be within 500 μm~1500 μm, and a width of the crystal grain of the cathode component may be within 20 μm~200 μm.

In some embodiments, the output power of laser may be within a range of 100 mW~500 mW.

In some embodiments, the scanning speed of laser may be within a range of 150 mm/s~2000 mm/s.

In some embodiments, the cathode component may be used for a flat filament of an X-ray tube.

Another aspect of the present disclosure may provide a system for preparing a cathode component. The system may include at least one storage device storing a set of instructions; at least one processor in communication with the at least one storage device, wherein when executing the set of instructions, the at least one processor is directed to cause the system to perform operations including: obtaining a three-dimensional (3D) model of the cathode component; obtaining a predetermined parameter, wherein the predetermined parameter includes at least one of a scanning direction of laser, an energy distribution of laser, an output power of laser or a scanning speed of laser; and controlling a 3D printer to perform, based on the 3D model and the predetermined parameter, a laser scanning on a raw material to obtain the cathode component.

Another aspect of the present disclosure may provide a cathode component. The cathode component may be prepared by operations comprising: obtaining a three-dimensional (3D) model of the cathode component; obtaining a predetermined parameter, wherein the predetermined parameter includes at least one of a scanning direction of laser, an energy distribution of laser, an output power of laser, or a scanning speed of laser; and controlling a 3D printer to perform, based on the 3D model and the predetermined parameter, a laser scanning on a raw material to obtain the cathode component.

BRIEF DESCRIPTION OF THE DRAWINGS

The present disclosure is further illustrated in terms of exemplary embodiments, and these exemplary embodiments are described in detail with reference to the drawings. These embodiments are not limited. In these embodiments, the same numeral indicates the same structure, wherein.

Figure 1:
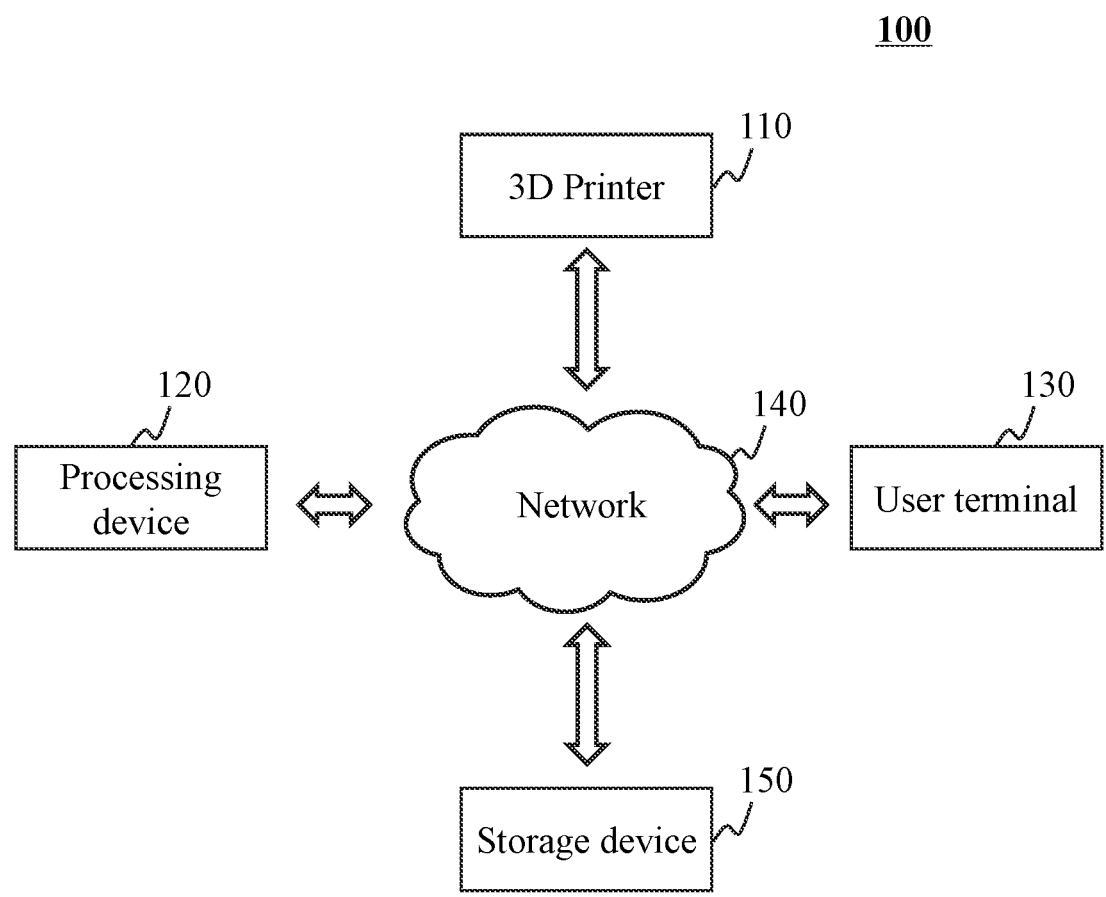
FIG. 1 is a schematic diagram illustrating an exemplary application scenario of a system for preparing a cathode component according to some embodiments of the present disclosure.

As shown in drawings, 600 may represent a cathode assembly, 610 may represent a flat filament or a cathode component, 611 may represent a hole, 612 may represent a crystal grain, 613 may represent a first crystal face, 614 may represent a second crystal face, 620 may represent a fixed component, 621 may represent an installation hole, 1000 may represent a crystallization region, and 1010 may represent a crystallization front.

DETAILED DESCRIPTION

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

FIG. 1 is a schematic diagram illustrating an exemplary application scenario of a system for preparing a cathode component according to some embodiments of the present disclosure. In some embodiments, the system may obtain the cathode component based on a method for preparing the cathode component described in the present disclosure.

As shown in FIG. 1, a system 100 for preparing the cathode component may include a three-dimensional (3D) printer 110, a processing device 120, a user terminal 130, a network 140, and a storage device 150.

In some embodiments of the present disclosure, the 3D printer 110 may also be referred to as a device for preparing the cathode component. The more descriptions of preparing the cathode component may be found elsewhere in the present disclosure, which may not be described herein.

In some embodiments, the processing device 120 may process data and/or information obtained from the user terminal 130 and/or the storage device 150. For example, the processing device 120 may control the 3D printer 110 to perform a laser scanning on a raw material based on a 3D model and a predetermined parameter of the cathode component obtained from the user terminal 130 and/or the storage device 150 to obtain the cathode component. In some embodiments, the processing device 120 may be an independent device, may be integrated into the 3D printer 110, or may be integrated into the user terminal 130. In some embodiments, the processing device 120 may include a single server or a server group. The server group may be centralized or distributed. In some embodiments, the processing device 120 may be local or remote. For example, the processing device 120 may access information and/or data from the user terminal 130 and/or the storage device 150 via the network 120. For another example, the processing device 120 may directly connect with the user terminal 130 and/or the storage device 150 to access information and/or data. For another example, the processing device 120 may connect with the 3D printer 110 via the network 120 to control the 3D printer 110 to perform a laser scanning on the raw material. For another example, the processing device 120 may directly connect with the 3D printer 110 to control the 3D printer 110 to perform a laser scanning on the raw material. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or any combination thereof.

In some embodiments, the processing device 120 may include a central processing unit (CPU), an application specific integrated circuit (ASIC), an application specific instruction set processor (ASIP), a physics processing unit (PPU), a digital signal processor (DSP), a field programmable gate array (FPGA), a programmable logic device (PLD), a controller, a microcontroller unit, a reduced instruction set computer (RISC), a microprocessor, or the like, or any combination thereof.

The user terminal 130 may include a mobile device, a tablet computer, a notebook computer, or the like, or any combination thereof. In some embodiments, the user terminal 130 may interact with other components in the system 100 for preparing the cathode component via a network. For example, the user terminal 130 may obtain the 3D model of the cathode component and/or the predetermined parameter input by the user, and send the 3D model of the cathode component and/or the predetermined parameter to the 3D printer 110, the processing device 120, and/or the storage device 150. For another example, the user terminal 130 may send one or more control instructions to the 3D printer 110 to control the 3D printer 110 to perform a laser scanning on the raw material. In some embodiments, the mobile device may include a smart home device, a wearable device, a mobile device, a virtual reality (VR) device, an augmented reality device, or the like, or any combination thereof. In some embodiments, the smart home device may include an intelligent lighting device, an intelligent electrical control device, an intelligent monitoring device, an intelligent TV, an intelligent camera, a walkie talkie, or the like, or any combination thereof. In some embodiments, the wearable device may include a bracelet, a pair of shoes and socks, a pair of glasses, a helmet, a watch, clothes, a backpack, a smart accessory, or the like, or any combination thereof. In some embodiments, the mobile device may include a mobile phone, a personal digital assistant (PDA), a game device, a navigation device, a POS device, a notebook computer, a tablet computer, a desktop computer, or the like, or any combination thereof. In some embodiments, the virtual reality device and/or the augmented reality device may include a virtual reality helmet, a pair of virtual reality glasses, a virtual reality patch, an augmented reality helmet, an augmented reality glasses, an augmented reality patch, or the like, or any combination thereof. For example, the virtual reality device and/or the augmented reality device may include Google glass™, Oculus Rift™, HoloLens™, or gear VR™, or the like.

The network 140 may include any suitable network that facilitates the exchange of information and/or data of the system 100 for preparing the cathode component. In some embodiments, one or more components (e.g., the 3D printer 110, the processing device 120, the user terminal 130, the storage device 150, etc.) of the system 100 for preparing the cathode component may exchange information and/or data with other components of the system 100 for preparing the cathode component via the network 140. For example, the processing device 120 may obtain the 3D model of the cathode component and/or the predetermined parameter from the user terminal 130 and the storage device 150 via the network 140. The network 140 may include a public network (e.g., the Internet), a private network (e.g., a local area network (LAN), a wide area network (WAN)), a wired network (e.g., Ethernet), a wireless network (e.g., a wireless Wi-Fi network), a cellular network (e.g., a long-term evolution (LTE) network), a frame relay network, a virtual private network (VPN), a satellite network, a telephone network, a router, a hub Server computer, or the like. For example, the network 140 may include a wired network, an optical fiber network, a telecommunications network, a local area network, a wireless local area network (WLAN), a metropolitan area network (MAN), a public switched telephone network (PSTN), Bluetooth™ network, ZigBee™, a near field communication (NFC) network, or the like. In some embodiments, the network 140 may include one or more network access points. For example, the network 140 may include wired and/or wireless network access points, such as base stations and/or internet exchange points, through which one or more components of the system 100 for preparing the cathode component may connect to the network 140 to exchange data and/or information.

The storage device 150 may store data (e.g., the 3D model of the cathode component, the predetermined parameters, etc.), instructions, and/or any other information. In some embodiments, the storage device 150 may store data obtained from the 3D printer 110, the user terminal 130. In some embodiments, the storage device 150 may store data and/or instructions executed or used by the processing device 120 to perform the exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, or the like. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR-SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), or a digital versatile disk ROM, or the like. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected with the network 140 to communicate with one or more components (e.g., the 3D printer 110, the processing device 120, the user terminal 130, etc.) in the system 100 for preparing the cathode component. The one or more components in the system 100 for preparing the cathode component may read data or instructions in the storage device 150 via the network 140. In some embodiments, the storage device 150 may be an independent device, or may be integrated into the 3D printer 110 and/or the user terminal 130.

Figure 2:
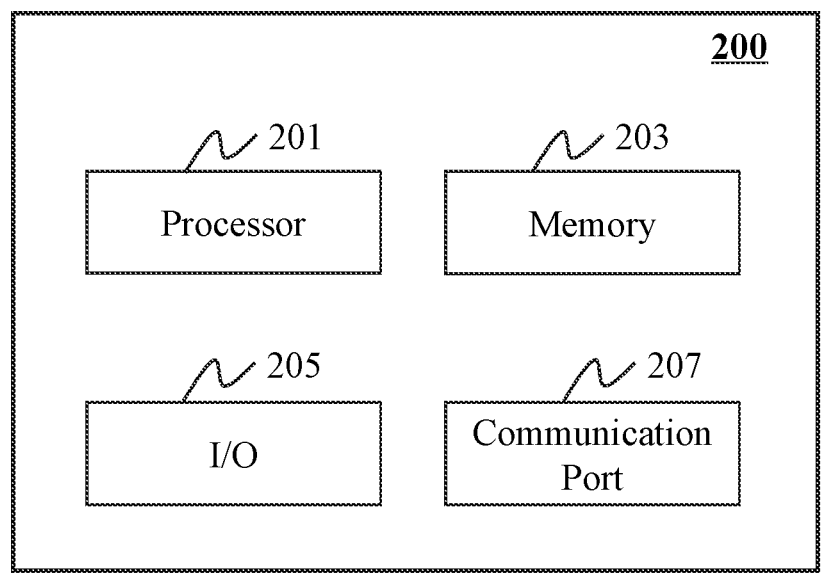
FIG. 2 is a schematic diagram illustrating an exemplary computing device according to some embodiments of the present disclosure.

FIG. 2 is a schematic diagram illustrating an exemplary computing device according to some embodiments of the present disclosure.

In some embodiments, the one or more components of the system 100 for preparing the cathode component may be implemented on a computing device 200. For example, the processing device 120 may be implemented on the computing device 200 and configured to implement the method described in the present disclosure.

The computing device 200 may include any component for implementing the system described in the present disclosure. For example, the processing device 120 may be implemented on the computing device 200 by a hardware, a software program, a firmware, or a combination thereof. For convenience, only one computing device is shown in the drawings, but a calculation function related to the system 100 for preparing the cathode component described in the present disclosure may be implemented by a group of similar platforms in a distributed manner to distribute the processing load of the system 100.

The computing device 200 may include a processor (e.g., a CPU) 201 that may execute program instructions in a form of one or more processors. The computing device 200 may also include a memory 203. For example, a hard disk, a read only memory (ROM), or a random access memory (RAM) may be used to store various data files processed and/or transmitted by a computer. The computing device 200 may include program instructions stored in the memory 203 and executed by the processor 201. The methods and/or processes of the present disclosure may be implemented in the form of program instructions. The computing device 200 may also include an input/output (I/O) 205 for allowing input/output between the computing device and other components. The computing device 200 may include a communication port 207 connected to a network for data communication. The computing device 200 may also receive programs and data in the present disclosure via a network.

For convenience, only one processor is shown in FIG. 2. However, it should be noted that the computing device 200 in the present disclosure may include a plurality of processors, and therefore, the operations and/or processer implemented by one processor described in the present disclosure may also be implemented by the plurality of processors jointly or independently. For example, in the present disclosure, the processor of the computing device 200 may execute operation A and operation B. it should be understood that operation A and operation B may also be executed jointly or independently by two different processors of the computing device 200 (e.g., a first processor may execute operation A and a second processor may execute operation B; or the first processor and the second processor may jointly execute operation A and operation B).

Figure 3:
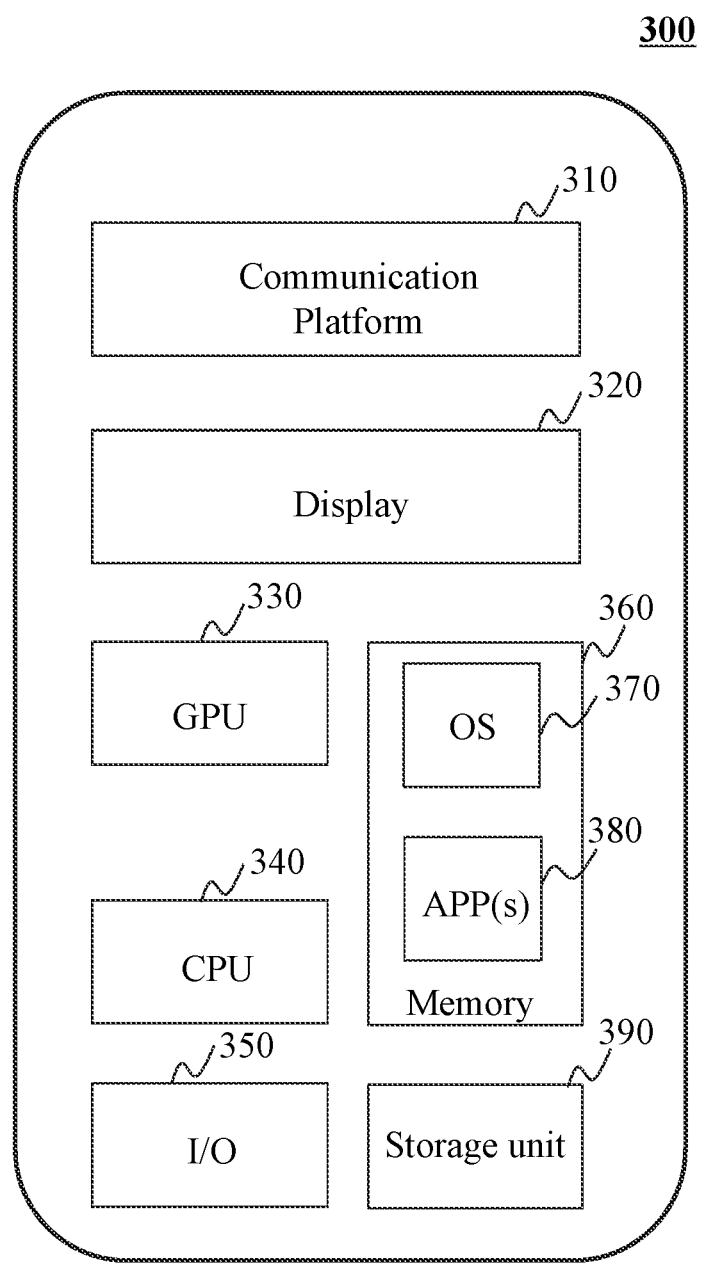
FIG. 3 is a schematic diagram illustrating an exemplary software and/or hardware of a mobile device according to some embodiments of the present disclosure.

FIG. 3 is a schematic diagram illustrating an exemplary software and/or hardware of a mobile device according to some embodiments of the present disclosure.

The user terminal 130 may be implemented on a mobile device 300. As shown in FIG. 3, the mobile device 300 may include a communication unit 310, a display unit 320, a graphics processor 330, a central processor 340, an input/output unit 350, a memory 360, and a storage unit 390. The mobile device 300 may also include a bus or a controller. In some embodiments, an operation system 370 and one or more applications (APPs) 380 may be loaded from the storage unit 390 into the memory 360 and executed by the processor 340. In some embodiments, the one or more APPs 380 may be configured to receive and display information about the method for preparing cathode component related to the processing device 120. The input/output unit 350 may perform an interaction between a user and the system 100 for preparing the cathode component, and provide interaction related information to other components (e.g., the processing device 120) in the system 100 for preparing the cathode component via the input/output unit 350.

In order to implement various modules, units and functions described in the present disclosure, a computer hardware platform may be used as a hardware platform for one or more components described in the present disclosure. A computer with a user interface component may be configured to implement functions of a personal computer (PC) or any other form of a workstation or a terminal device. With proper programming, a computer may be act as a server.

Figure 4:
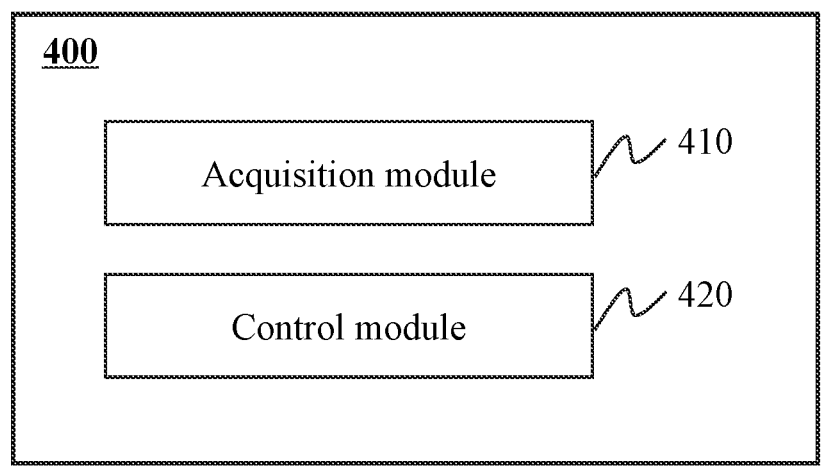
FIG. 4 is a block diagram illustrating an exemplary processing device according to some embodiments of the present disclosure.

FIG. 4 is a block diagram 400 illustrating an exemplary processing device according to some embodiments of the present disclosure.

As shown in FIG. 4, a processing device may include an acquisition module 410 and a control module 420.

The acquisition module 410 may be configured to obtain information about the system 100 for preparing the cathode component. For example, the acquisition module 410 may obtain a 3D model and a predetermined parameter of the cathode component. The more descriptions of the acquisition module 410 or obtained information may be found elsewhere in the present disclosure, for example, FIG. 5, and may not be described herein. In some embodiments, the acquisition module 410 may obtain information from one or more components (e.g., the storage device 150 and/or the user terminal 130) in the system 100 for preparing the cathode component.

The control module 420 may be configured to control the 3D printer to perform a laser scanning on a raw material to obtain the cathode component based on information obtained by the acquisition module 410. The more descriptions of the control module 420 or the cathode component obtained by performing a laser scanning may be found elsewhere in the present disclosure, for example, FIG. 5, and may not be described herein.

It should be understood that the processing device and modules shown in FIG. 4 may be implemented in various ways. For example, in some embodiments, the processing device and modules may be implemented by a hardware, a software, or a combination thereof. A portion of the hardware may be implemented by special logic. A portion of the software may be stored in a memory and executed by an appropriate instruction execution system, such as a microprocessor or specially designed hardware. Those skilled in the art should understand that the described processes and processing device be implemented by using computer executable instructions and/or contained in a control code of a processor. For example, the control code may be provided on a carrier medium such as a magnetic disk, a compact disk (CD) or a digital video disk-read only memory (DVD-ROM), a programmable memory such as a read only memory (e.g., a firmware), or a data carrier such as an optical or electronic signal carrier. The processing device and modules in the present disclosure may not only be implemented by a hardware circuit such as a very large-scale integration, a gate array, a logic chip, a transistor made of semiconductor, or a programmable hardware device such as a field programmable gate array or a programmable logic device, may also be implemented by a combination thereof (e.g., firmware).

It should be noted that the above descriptions of the processing device and modules is merely for convenience of descriptions, and may not limit the scope of the present disclosure. It should be understood that, for those skilled in the art, after understanding the principle of the system, combinations of various modules without departing from this principle may be made, or a subsystem may be formed to connect with other modules. For example, the processing device may further include one or more other modules, and/or may not include one or more of the modules described above. For another example, the acquisition module 410 and the control module 420 described in FIG. 4 may be different modules in the same system, or a module may implement two or more functions described above. For another example, the acquisition module 410 describe in FIG. 4 may include a 3D model acquisition sub-module of the cathode component and a predetermined parameter acquisition sub-module. In some embodiments, a module in the processing device may share one memory module, or a module may have an own memory module. Such changes are within the scope of the present disclosure.

Figure 5:
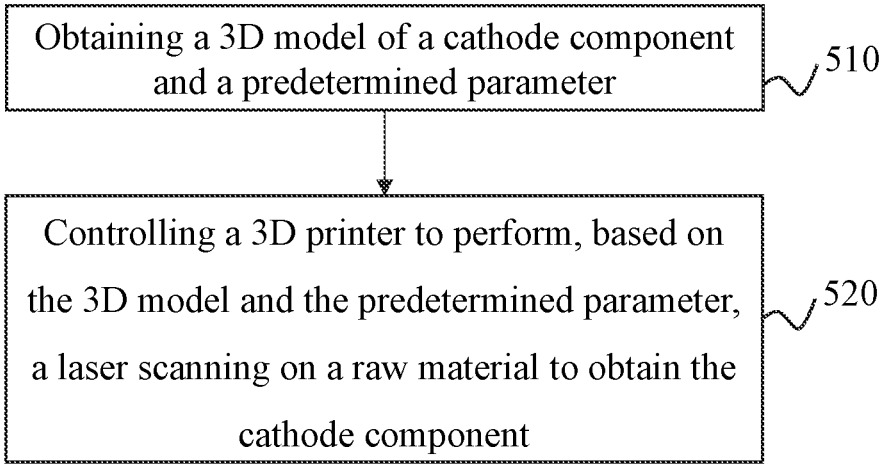
FIG. 5 is a flowchart illustrating an exemplary process for preparing a cathode component according to some embodiments of the present disclosure.

FIG. 5 is a flowchart illustrating an exemplary process for preparing a cathode component according to some embodiments of the present disclosure. In some embodiments, process 500 may be executed by a processing logic. The processing logic may include a hardware (e.g., a circuit, a special purpose logic, a programmable logic, a microcode, etc.), a software (instructions executed on the processing device to perform hardware emulation), or any combination thereof. One or more operations in the process 500 for preparing a cathode component shown in FIG. 5 may be implemented by a processing device. For example, the process 500 may be stored in a storage device in the form of instructions and called and/or implemented by the processing device. In some embodiments, the cathode component may be prepared by using additive manufacturing technology (also referred to as 3D printing technology) by implementing the process 500. In some embodiments, the process 500 may be implemented by a 3D printing device (also referred to as a 3D printer).

As shown in FIG. 5, the process 500 may include the following operations.

In 510, a 3D model of the cathode component and a predetermined parameter may be obtained.

In some embodiments, the cathode component may include a filament. For example, the filament may include, but be not limited to, a spiral filament or a flat filament. The more descriptions of the cathode component of flat filament may be found elsewhere in the present disclosure, for example, FIGS. 6-9 and descriptions thereof, which may not be described herein. In the present disclosure, the cathode component may also be referred to as a cathode structure.

In some embodiments, the 3D model may refer to a polygonal representation of an object (e.g., the cathode component). The 3D model may present a structural feature of the object.

In some embodiments, the predetermined parameter may include at least one of a scanning direction of laser, an energy distribution of laser, an output power of laser, or a scanning speed of laser.

In some embodiments, the 3D model of the cathode component and/or the predetermined parameter may be obtained from a storage device. For example, the 3D model of the cathode component and/or the predetermined parameter may be stored in a local storage device of the 3D printing device, and the 3D model of the cathode component and/or the predetermined parameter may be obtained by reading the local storage device. For another example, the 3D model of the cathode component and/or the predetermined parameter may be stored in an external storage device (e.g., a USB flash disk, a mobile hard disk, an optical disk, a memory card, etc.). After the external storage device is connected with the 3D printing device, the 3D printing device may obtain the 3D model of the cathode component and/or the predetermined parameter by reading the external storage device. In some embodiments, the 3D model and/or the predetermined parameter may be transmitted from the external device to the 3D printing device via a network. For example, the user may send the 3D model and/or the predetermined parameter from a client to the 3D printing device via the network after the client (also referred to as the "user terminal") constructs the 3D model and/or resets the predetermined parameter. In some embodiments, the 3D model of the cathode component may be constructed and/or the predetermined parameter may be reset based on actual requirements.

The 3D model may be constructed by various ways. In some embodiments, the 3D model may be obtained by measuring and modeling based on an instrument equipment. For example, the cathode component may be scanned by a 3D scanner to obtain 3D spatial coordinates of a sampling point on a scanning surface of the cathode component and the structural data inside the cathode component. In some embodiments, the 3D model may be obtained by a modeling software (e.g., CATIA, 3DMAX). In some embodiments, the 3D model may also be obtained by modeling based on an image or a video.

In 520, a 3D printer may be controlled to perform, based on the 3D model and the predetermined parameter, a laser scanning on a raw material (e.g., a cathode material) to obtain the cathode component.

In some embodiments, the raw material may include tungsten. In some embodiments, the raw material may be powder, block, or the like.

In some embodiments, a particle size of the raw material may affect sizes and an arrangement of holes distributed inside the cathode component, thereby affecting a performance or a quality (e.g., a high temperature strength, a high temperature creep resistance, a heat loss) of the cathode component. For example, if the particle size of the raw material is too large, a size (e.g., a diameter) of a hole may be large, and the performance of the cathode component may be low (e.g., performances of high temperature strength and high temperature creep resistance may be low). In some embodiments, the particle size of raw materials may need to meet a predetermined condition to reduce the working current of the cathode component. A relatively small working current of the cathode component may improve a performance or a quality of the cathode component. For example, a relatively small working current of the cathode component may reduce the heat loss of the cathode component, reduce the size of a support component of the cathode component, or achieve other effects. Merely by way of example, if the particle size of the raw material is too small, the size (e.g., the diameter) of the hole be small, and then an area of a cross-section of the cathode component may be large, a resistance of the cathode component may be small, a working current of the cathode component may be large, and the heat loss may be high. Therefore, the particle size of raw materials may need to meet a predetermined condition.

In some embodiments, the particle size of the raw material may be in a range of 20 nm~20 μm. In some embodiments, the particle size of the raw material may be in a range of 50 nm~18 μm. In some embodiments, the particle size of the raw material may be in a range of 80 nm~16 μm. In some embodiments, the particle size of the raw material may be in a range of 100 nm~14 μm. In some embodiments, the particle size of the raw material may be in a range of 200 nm~12 μm. In some embodiments, the particle size of the raw material may be in a range of 300 nm~10 μm. In some embodiments, the particle size of the raw material may be in a range of 400 nm~8 μm. In some embodiments, the particle size of the raw material may be in a range of 500 nm~7 μm. In some embodiments, the particle size of the raw material may be in a range of 600 nm~6 μm. In some embodiments, the particle size of the raw material may be in a range of 700 nm~5 μm. In some embodiments, the particle size of the raw material may be in range of 800 nm~4 μm. In some embodiments, the particle size of the raw material may be in a range of 900 nm~3 μm. In some embodiments, the particle size of the raw material may be in a range of 1000 nm~2 μm.

In some embodiments, the raw material may be obtained by mixing powder with different particle sizes in a predetermined proportion, thus the performance of heat loss of the cathode component may be low, and the performance of the high temperature strength and high temperature creep resistance may be improved, thus the quality of the cathode component may be improved.

In some embodiments, during the process of preparing the cathode component, a layer of the raw material with a certain thickness may be laid on a substrate of the 3D printing device. Based on layered slice information of the 3D model, a scanning system of the 3D printing device may control a laser beam to act on the raw material based on the predetermined parameter. Under the action of laser energy, the raw material may be melt, and may be cooled and solidified by heat dissipation.

After a layer is scanned and formed, the laser or a laser source may rise a certain distance, or the substrate may fall a certain distance. Then, another layer of the raw material may be laid on the formed layer and repeat the above-mentioned scanning process until all slice layers of the 3D model are scanned. Thus, the cathode component is directly formed based on the 3D model with a way of a layer-by-layer accumulation.

In some embodiments, the predetermined parameter may be adjusted to control the laser scanning, further controlling the quality of a single-layer printing, and controlling the structure of cathode component obtained by a multi-layer printing (e.g., a growth direction of a crystal grain, a size of the crystal grain, an internal pore size and distribution of the cathode component, an orientation of a crystal face, etc.). Thus, the performance (e.g., an electron emission ability, high temperature creep resistance, heat loss, high temperature strength, etc.) of the cathode component may be controlled.

After the laser beam is emitted on the raw material, a temperature field may be formed. The temperature field may reflect a distribution of temperature in time and/or space. The growth direction of the crystal grain may be related to a temperature gradient in the temperature field. The temperature gradient may reflect a change of the temperature. For example, the larger the temperature gradient is, the greater the temperature changes. For example, if the temperature gradient in a first direction (e.g., the X direction shown in FIG. 6) is greater than temperature gradients in other directions, the crystal grain may grow mainly along the first direction (e.g., the growth direction of the crystal grain is the first direction), and an elliptical crystal grain with a long axis along the first direction may be obtained.

In some embodiments, during the process of scanning, the scanning direction of laser may affect the growth direction of the crystal grain in the cathode component, thereby affecting the performance of the cathode component. The scanning direction of laser may refer to a motion direction of the laser or the laser source. In some embodiments, the temperature gradient along the scanning direction of the laser may be large. Therefore, the crystal grain may grow along the scanning direction of laser.

In some embodiments, the scanning direction of laser may be perpendicular to a principal stress direction of the cathode component, so that the growth direction of the crystal grain of the cathode component may be perpendicular to the principal stress direction of the cathode component, further improving the performance of the high-temperature creep resistance of the cathode component. In some embodiments, the principal stress direction of the cathode component may be parallel to a long axis direction or a direction of a length of the cathode component. The more descriptions of the principal stress direction of the cathode component may be found elsewhere in the present disclosure, for example, FIG. 6 and the descriptions thereof, which may not be described herein.

In some embodiments, the energy distribution of laser may affect the temperature field of the cathode component growth, further affect the growth direction of the crystal grain in the cathode component, and the performance of the cathode component. When the laser beam is emitted on the raw material, a laser spot may be formed. The energy distribution of laser may refer to an energy distribution on the laser spot. In general, a feature of the energy distribution on the laser spot may be that the energy is high in the middle, and the energy is low around. Therefore, when the laser beam is emitted on the raw material, the temperature distribution at a crystallization front of a melting zone may be high in the middle, and may be low around. In this case, the temperature gradient along the scanning direction of laser may not be greater than the temperature gradients along other directions, so that the crystal grain may not grow mainly along the scanning direction of laser. In some embodiments, the energy distribution of laser may be adjusted to a flat-top distribution, thus the temperature distribution at the crystallization front of the melting zone may be flat-top distribution when the laser beam is emitted on the raw material. The flat-top distribution may mean that the temperature gradient along the scanning direction of laser is greater than the temperature gradients in other directions. For example, when the temperature distribution of the crystallization front in the melting zone is flat-top distribution, the temperature gradient in the scanning direction of laser may be large, and the temperature gradient in the direction perpendicular to the scanning direction of laser may be small. Thus, the growth direction of the crystal grain may be along the scanning direction of laser and perpendicular to the principal stress direction of the cathode component, and a high-quality cathode component may be obtained. In some embodiments, the laser beam may be a flat-top beam, thus the energy distribution may be presented as a flat-top distribution. The more descriptions of the flat-top distribution may be found elsewhere in the present disclosure, for example, FIG. 10 and descriptions thereof, which may not be described herein.

In some embodiments, an output power of laser and a scanning speed of laser may affect the temperature field (e.g., the temperature gradient) of the cathode component growth, further affect the size of the crystal grain in the cathode component, and the quality of the cathode component. For example, if the output power of laser is too high or the scanning speed of laser is too low, a penetration depth may be great, and the multi-layer stack of additive manufacturing may not be implemented, and the porosity of the cathode component may not be ensured. For another example, if the output power of laser is too low or the scanning speed of laser is too high, the raw material may not be melted effectively, thus additive manufacturing may not be implemented. Therefore, both the output power of laser and the scanning speed of laser may need to meet a predetermined condition. In some embodiments, under a joint action of an appropriate output power of laser and an appropriate scanning speed of laser, the temperature gradient in the scanning direction of laser at the crystallization front of the melting zone may be much larger than the temperature gradient in the direction perpendicular to the scanning direction of laser, thus the growth direction of the crystal grain may be along the scanning direction of laser.

In some embodiments, the output power of laser may be in a range of 10 mW~1000 mW. In some embodiments, the output power of laser may be in a range of 20 mW~900 mW. In some embodiments, the output power of laser may be in a range of 30 mW~850 mW. In some embodiments, the output power of laser may be in a range of 40 mW~800 mW. In some embodiments, the output power of laser may be in a range of 50 mW~750 mW. In some embodiments, the output power of laser may be in a range of 60 mW~700 mW. In some embodiments, the output power of laser may be in a range of 70 mW~650 mW. In some embodiments, the output power of laser may be in a range of 80 mW~600 mW. In some embodiments, the output power of laser may be in a range of 90 mW~550 mW. In some embodiments, the output power of laser may be in a range of 100 mW~500 mW. In some embodiments, the output power of laser may be in a range of 110 mW~450 mW. In some embodiments, the output power of laser may be in a range of 120 mW~400 mW. In some embodiments, the output power of laser may be in a range of 130 mW~350 mW. In some embodiments, the output power of laser may be in a range of 140 mW~300 mW. In some embodiments, the output power of laser may be in a range of 150 mW~250 mW. In some embodiments, the output power of laser may be in a range of 160 mW~200 mW.

In some embodiments, the scanning speed of laser may be in a range of 100 mm/s~3000 mm/s. In some embodiments, the scanning speed of laser may be in a range of 110 mm/s~2800 mm/s. In some embodiments, the scanning speed of laser may be in a range of 120 mm/s~2600 mm/s. In some embodiments, the scanning speed of laser may be in a range of 130 mm/s~2400 mm/s. In some embodiments, the scanning speed of laser may be in a range of 140 mm/s~2200 mm/s. In some embodiments, the scanning speed of laser may be in a range of 150 mm/s~2000 mm/s.

In some embodiments, the scanning speed of laser may be in a range of 160 mm/s~1800 mm/s. In some embodiments, the scanning speed of laser may be in a range of 170 mm/s~1600 mm/s. In some embodiments, the scanning speed of laser may be in a range of 180 mm/s~1400 mm/s. In some embodiments, the scanning speed of laser may be in a range of 190 mm/s~1200 mm/s. In some embodiments, the scanning speed of laser may be in a range of 200 mm/s~1000 mm/s. In some embodiments, the scanning speed of laser may be in a range of 300 mm/s~900 mm/s. In some embodiments, the scanning speed of laser may be in a range of 400 mm/s~800 mm/s. In some embodiments, the scanning speed of laser may be in a range of 500 mm/s~700 mm/s. In some embodiments, the scanning speed of laser may be in a range of 550 mm/s~650 mm/s.

In some embodiments, a thickness of a layer of the raw material may be related to a forming thickness of the single layer printing. For example, the thickness of a layer may not be less than a forming thickness of the single layer printing.

In some embodiments, the forming thickness of the single layer printing may affect the size and arrangement of the holes distributed inside the cathode component, and thus affect the performance and quality of the cathode component. Therefore, the forming thickness of single layer printing may need to meet the predetermined condition.

In some embodiments, the forming thickness of single layer printing may be in a range of 0.005 m~0.05 mm. In some embodiments, the forming thickness of single layer printing may be in a range of 0.01 m~0.048 mm. In some embodiments, the forming thickness of single layer printing may be in a range of 0.015 m~0.045 mm. In some embodiments, the forming thickness of single layer printing may be in a range of 0.02 m~0.042 mm. In some embodiments, the forming thickness of the single layer printing may be in a range of 0.025 m~0.04 mm. In some embodiments, the forming thickness of single layer printing may be in a range of 0.03 m~0.038 mm. In some embodiments, the forming thickness of single layer printing may be in a range of 0.032 m~0.035 mm. In some embodiments, the forming thickness of single layer printing may be 0.01 mm. In some embodiments, the forming thickness of single layer printing may be 0.02 mm. In some embodiments, the forming thickness of single layer printing may be 0.03 mm. In some embodiments, the forming thickness of single layer printing may be 0.04 mm. In some embodiments, the forming thickness of the single layer printing may be 0.05 mm.

In some embodiments, after the cathode component is obtained based on the process 500, the cathode component may also be reprocessed. In some embodiments, a reprocessing operation may include heat treating the cathode component. In some embodiments, the heat treatment may include heating the cathode component above a recrystallization temperature and holding the cathode component for a predetermined time. In some embodiments, the heat treatment may eliminate an internal stress of the cathode component (e.g., a stress generated during the preparation based on the process 500) and optimize the size of the crystal grain of the cathode component to further improve the performance of the cathode component (e.g., improve the performance of high temperature creep resistance). For example, a cathode component with a predetermined size of crystal grain may be obtained by heat treating the cathode component under a predetermined condition (e.g., a recrystallization temperature, a predetermined holding time). The more descriptions of the predetermined size of the crystal grain may be found elsewhere in the present disclosure, for example, FIG. 8 and descriptions thereof, which may not be described herein.

In some embodiments, the recrystallization temperature and the predetermined holding time may affect the performance of the cathode component. Therefore, the recrystallization temperature and the predetermined holding time may need to meet the predetermined condition. The raw material may be tungsten. In some embodiments, the recrystallization temperature may be in a range of 2000° C.~3000° C. In some embodiments, the recrystallization temperature may be in a range of 2200° C.~2800° C. In some embodiments, the recrystallization temperature may be in a range of 2400° C.~2600° C. In some embodiments, the recrystallization temperature may be in a range of 2450° C.~2550° C.

In some embodiments, the predetermined holding time may be in a range of 0.001 h~1 h. In some embodiments, the predetermined holding time may be in a range of 0.01 h~0.8 h. In some embodiments, the predetermined holding time may be in a range of 0.1 h~0.6 h. In some embodiments, the predetermined holding time may be in a range of 0.2 h~0.5 h. In some embodiments, the predetermined holding time may be in a range of 0.3 h~0.4 h.

In some embodiments, the reprocessing operation may also include cold working the cathode component. In some embodiments, cold working may include, but be not limited to, cold rolling, cold drawing, cold forging, stamping, and cold extrusion, or the like. In some embodiments, the cold working may promote preferential growth of the crystal grain of the cathode component to further improve the quality of the cathode component. In some embodiments, preferential growth of the crystal grain may mean that orientation of a crystal face of an emitting surface of the cathode component may be biased toward a crystal face with lower work function. For example, when the cathode component is tungsten, a crystal face with preferential growth of the crystal grain may include a crystal face (310) and/or a crystal face (111).

In some embodiments, the reprocessing operation may further include polishing the cathode component. In some embodiments, a polishing operation may refer to processing a surface of the cathode component to reduce roughness of the surface and further reduce a thermal radiation coefficient of the cathode component. Since the main heat dissipation mode of the cathode component may be radiation heat dissipation, the polishing operation may reduce the heat loss of the cathode component.

In some embodiments, the polishing operation may include, but be not limited to, mechanical polishing operation, or chemical polishing operation. In some embodiments, the mechanical polishing operation may refer to performing a grinding and rolling operation on the surface of the cathode component by using a polishing medium (e.g., polishing powder). In some embodiments, the chemical polishing operation may refer to performing a chemical etching processing on the surface of the cathode component by using a chemical agent.

In some embodiments, the polishing operation may make the roughness Ra of the surface of the cathode component not greater than 1.2 μm. In some embodiments, the polishing operation may make the roughness Ra of the surface of the cathode component not greater than 1.0 μm. In some embodiments, the polishing operation may make the roughness Ra of the surface of the cathode component not greater than 0.9 μm. In some embodiments, the polishing operation may make the roughness Ra of the surface of the cathode component not greater than 0.8 μm. In some embodiments, the polishing operation may make the roughness Ra of the surface of the cathode component not greater than 0.7 µm. In some embodiments, the polishing operation may make the roughness Ra of the surface of the cathode component not greater than 0.6 µm. In some embodiments, the polishing operation may make the roughness Ra of the surface of the cathode component not greater than 0.5 µm.

In some embodiments, the reprocessing operation may include performing at least one of heat treatment, cold processing, and polishing operation on the cathode component. The embodiments of the present disclosure do not limit the sequence of the reprocessing operation. For example, the reprocessing operation may include cold working first and then heat treatment. The cold working may further make the growth direction of the crystal grain perpendicular to the principal stress direction of the cathode component. The heat treatment may increase the size of the crystal grain and further improve the performance of high temperature creep resistance.

It should be noted that the above description is merely for example and illustration, and does not limit the scope of the present disclosure. For those skilled in the art, various modifications and changes may be made under the guidance of the present disclosure. However, these modifications and changes are still within the scope of the present disclosure.

Figure 6:
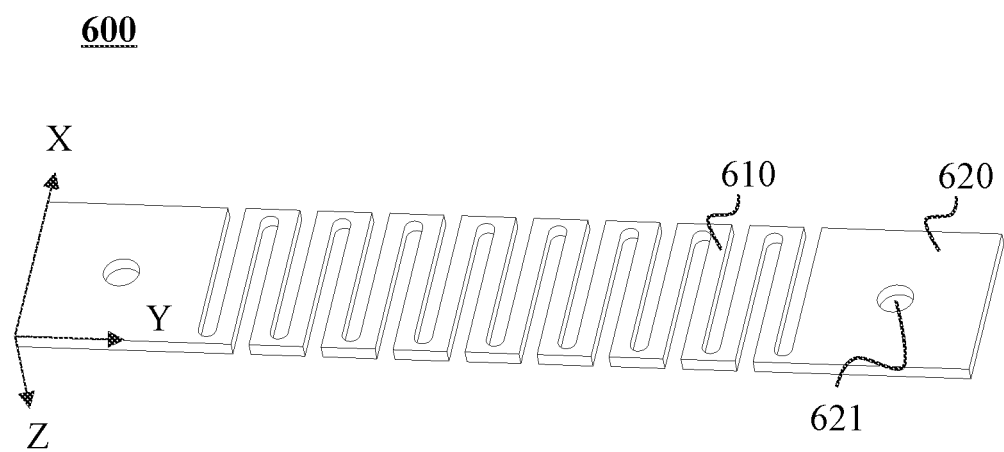
FIG. 6 is a schematic diagram illustrating an exemplary structure of a cathode assembly according to some embodiments of the present disclosure.

FIG. 6 is a schematic diagram illustrating an exemplary structure of a cathode assembly according to some embodiments of the present disclosure.

As shown in FIG. 6, a cathode assembly 600 may include a flat filament 610 and a fixed component 620.

In some embodiments, the flat filament 610 may be installed and fixed by the fixed component 620. In some embodiments, the flat filament 610 may be the cathode component obtained in the process 500 and may be used for an X-ray tube. In the embodiments of the present disclosure, the flat filament and the cathode component may be replaced by each other.

In some embodiments, the fixed component 620 may include an installation hole 621 for installing the flat filament 610 based on an installing component (e.g., a bolt). For example, the flat filament 610 may be attached to the X-ray tube through the fixed component 620.

After the flat filament 610 is heated and expanded, the principal stress direction of the flat filament may be generally parallel to the long axis direction of the flat filament 610. As shown in FIG. 6, a coordinate system may be constructed with the long axis direction of the flat filament 610 as the Y axis of the coordinate system, the short axis direction of the flat filament 610 as the X axis of the coordinate system, and the direction perpendicular to a plane where the flat filament 610 is located as the Z axis of the coordinate system. The principal stress direction of the cathode component may be parallel to the Y axis. The scanning direction of laser may be parallel to the X axis.

In some embodiments, a plurality of holes may be distributed inside the cathode component obtained from the process 500. In some embodiments, when the laser beam is emitted on the raw material, a portion of powder particles may melt and contract into a sphere under an action of interfacial tension. The laser beam may move continuously, and the sphere may be cooled and solidified rapidly. After the laser beam moves a certain distance, the powder particles may be melted to form another sphere. By repeating the above operations, a gap may be formed between two adjacent spheres, thereby obtaining the cathode component with the plurality of holes inside.

In some embodiments, a pore forming agent may also be added to the raw material. When the laser beam is emitted on the mixture of the raw material and the pore forming agent, the raw material may melt to form a melting zone. The pore forming agent may decompose to generate gas and dissolve in the melted raw material. The laser beam may move continuously, the melting zone may be rapidly cooled and solidified, and the gas may cause a form of pores, thereby obtaining the cathode component with the plurality of holes inside.

In some embodiments, the 3D model of a cathode component including a plurality of holes inside may be designed, and then a cathode component with the plurality of holes inside corresponding to the 3D model may be prepared based on the process 500.

Figure 7:
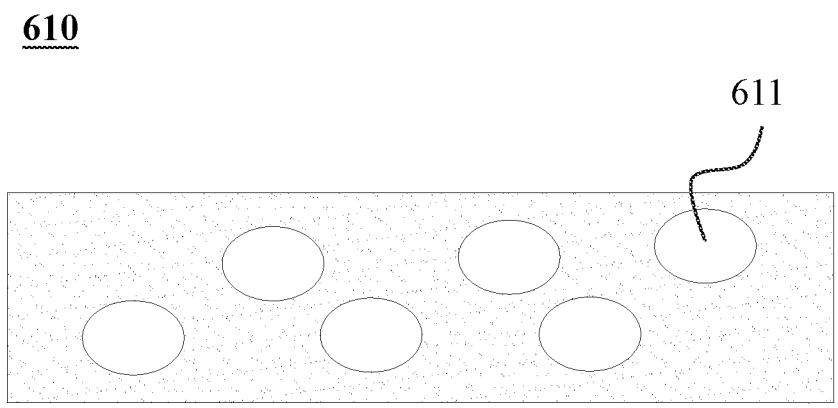
FIG. 7 is a sectional view illustrating an exemplary cathode component according to some embodiments of the present disclosure.

FIG. 7 is a sectional view illustrating an exemplary cathode component according to some embodiments of the present disclosure. FIG. 7 shows a cross section of the flat filament 610 in FIG. 6, wherein the cross section may be parallel to the X-Z coordinate plane, the X-Y coordinate plane, or the Y-Z coordinate plane.

As shown in FIG. 7, a plurality of holes 611 may be distributed inside the cathode component 610. In some embodiments, a shape of a hole 611 may include regular or irregular shapes, such as circular, elliptical, polygonal, or the like. In some embodiments, the plurality of holes 611 may be arranged in regular or irregular shapes such as circular, elliptical, polygonal, etc.

A size (e.g., a diameter) of a hole 611 and porosity of the cathode component may affect the performance or quality (e.g., the performance of high temperature strength, high temperature creep resistance, heat loss) of the cathode component 610. For example, if the size (e.g., a diameter) of a hole 611 is large or the porosity is large, the performance of the cathode component 610 may be reduced (e.g., the performance of high temperature strength and the high-temperature creep resistance may be reduced). For another example, the size (e.g., a diameter) of the hole 611 is small or the porosity is small, an area of the cross section of the cathode component 610 may be large, the resistance of the cathode component may not be increased. In order to produce the same heat, a larger working current in cathode may be required, thus the heat loss of other components may be increased. Therefore, in order to make the cathode component 610 have a better high temperature strength, high temperature creep resistance, and low heat loss, the size (e.g., a diameter) of the hole 611 and porosity of the cathode component may need to meet a predetermined condition.

In some embodiments, the size of the hole 611 may represent the diameter of the hole 611, the diameter of an inscribed circle or a circumscribed circle of the hole 611.

In some embodiments, the diameter of the hole 611 may not be greater than 80 µm. In some embodiments, the diameter of the hole 611 may not be greater than 70 µm. In some embodiments, the diameter of the hole 611 may not be greater than 60 µm. In some embodiments, the diameter of the hole 611 may not be greater than 50 µm. In some embodiments, the diameter of the hole 611 may not be greater than 40 µm. In some embodiments, the diameter of the hole 611 may not be greater than 30 µm. In some embodiments, the diameter of the hole 611 may not be greater than 20 µm.

In some embodiments, the diameter of the hole 611 may be in a range of 20 µm~80 µm. In some embodiments, the diameter of the hole 611 may be in a range of 25 µm~75 µm. In some embodiments, the diameter of the hole 611 may be in a range of 30 µm~70 µm. In some embodiments, the diameter of the hole 611 may be between 35 μm~65 μm. In some embodiments, the diameter of the hole 611 may be in a range of 40 μm~60 μm. In some embodiments, the diameter of the hole 611 may be in a range of 45 μm~55 μm.

In some embodiments, the porosity of the cathode component may represent a percentage of the total volume of the plurality of holes 611 inside the cathode component 610 to the total volume of cathode component 610 in a natural state.

In some embodiments, the porosity may not be higher than 30%. In some embodiments, the porosity may not be higher than 25%. In some embodiments, the porosity may not be higher than 20%. In some embodiments, the porosity may not be higher than 15%. In some embodiments, the porosity may not be higher than 10%. In some embodiments, the porosity may not be higher than 5%.

In some embodiments, the porosity may be in a range of 5%-30%. In some embodiments, the porosity may be in a range of 8%-27%. In some embodiments, the porosity may be in a range of 10%-25%. In some embodiments, the porosity may be in a range of 12%-23%. In some embodiments, the porosity may be in a range of 15%-20%. In some embodiments, the porosity may be in a range of 17%-18%.

Figure 8:
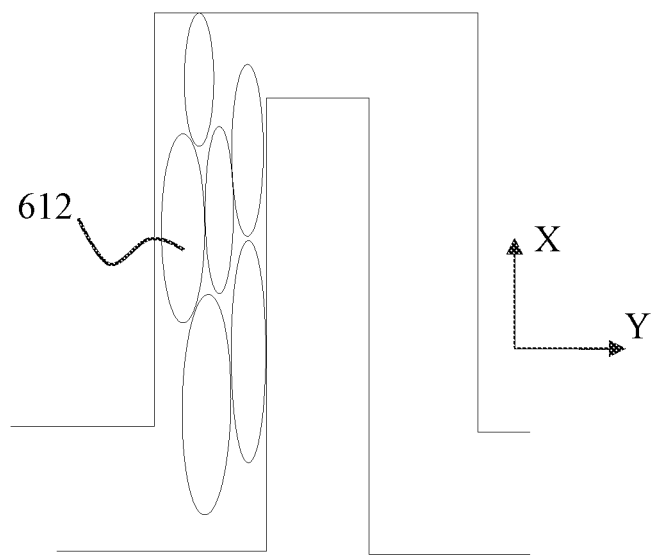
FIG. 8 is a schematic diagram illustrating an exemplary crystal structure of a cathode component according to some embodiments of the present disclosure.

FIG. 8 is a schematic diagram illustrating an exemplary crystal structure of a cathode component according to some embodiments of the present disclosure. FIG. 8 is a schematic diagram of the flat filament 610 in FIG. 6 along a plane parallel to the X-Y coordinate plane.

As shown in FIG. 8, the cathode component 610 may include a plurality of crystal grains 612. Referring to FIG. 6, a size of a crystal grain 612 in the X-axis direction may be greater than a size of the crystal grain in the Y-axis direction. In the embodiments of the present disclosure, the size of the crystal grain 612 in the X-axis direction may be referred to as a length, and the size of the crystal grain 612 in the Y-axis direction may be referred to as a width. In combination with the above descriptions, based on the process 500, the crystal grains may be mainly grown along the scanning direction (e.g., the X direction) of laser by adjusting the predetermined parameter to obtain the cathode component 610. The direction of the length of the crystal grains 612 may be along the scanning direction (e.g., the X direction) of laser, and may be perpendicular to the principal stress direction (e.g., the Y direction) of the cathode component 610, thus the performance of the cathode component 610 may be improved (e.g., the performance of high temperature creep resistance may be improved).

In some embodiments, the length of the crystal grain may be in a range of 400 μm~1600 μm. In some embodiments, the length of the crystal grain may be in a range of 450 μm~1550 μm. In some embodiments, the length of the crystal grain may be in a range of 500 μm~1500 μm. In some embodiments, the length of the crystal grain may be in a range of 550 μm~1450 μm. In some embodiments, the length of the crystal grain may be in a range of 600 μm~1400 μm. In some embodiments, the length of the crystal grain may be in a range of 650 μm~1350 μm. In some embodiments, the length of the crystal grain may be in a range of 700 μm~1300 μm. In some embodiments, the length of the crystal grain may be in a range of 750 μm~1250 μm. In some embodiments, the length of the crystal grain may be in a range of 800 μm~1200 μm. In some embodiments, the length of the crystal grain may be in a range of 850 μm~1150 μm. In some embodiments, the length of the crystal grain may be in a range of 900 μm~1100 μm. In some embodiments, the length of the crystal grain may be between 950 μm~1050 μm.

In some embodiments, the width of the crystal grain may be in a range of 20 μm~200 μm. In some embodiments, the width of the crystal grain may be in a range of 30 μm~180 μm. In some embodiments, the width of the crystal grain may be in a range of 40 μm~160 μm. In some embodiments, the width of the crystal grain may be in a range of 50 μm~150 μm. In some embodiments, the width of the crystal grain may be in a range of 60 μm~140 μm. In some embodiments, the width of the crystal grain may be in a range of 70 μm~130 μm. In some embodiments, the width of the crystal grain may be in a range of 80 μm~120 μm. In some embodiments, the width of the crystal grain may be in a range of 90 μm~110 μm. In some embodiments, the width of the crystal grain may be in a range of 95 μm~100 μm.

Figure 9:
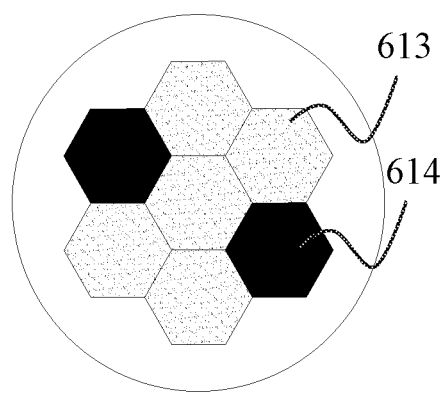
FIG. 9 is a schematic diagram illustrating an exemplary orientation of a crystal face of an emitting surface of a cathode component according to some embodiments of the present disclosure.

FIG. 9 is a schematic diagram illustrating an exemplary orientation of a crystal face of an emitting surface of a cathode component according to some embodiments of the present disclosure.

As shown in FIG. 9, the emitting surface of the cathode component 610 may include a first crystal face 613 having a lower work function and a second crystal surface 614 having a higher work function. In combination with the above descriptions, the first crystal face 613 may be a crystal face in which the crystal grain is preferentially grown. For example, when the cathode component is tungsten, the first crystal face 613 may include a crystal face (310) and/or crystal face (111).

The larger a ratio of an area of the first crystal face 613 to an area of the emitting surface of the cathode component 610, the stronger the electron emission ability of the cathode component 610 is. In some embodiments, the area of the first crystal face 613 may account for more than 50% of the area of the emitting surface of the cathode component 610. In some embodiments, the area of the first crystal face 613 may account for more than 60% of the area of the emitting surface of the cathode component 610. In some embodiments, the area of the first crystal face 613 may account for more than 70% of the area of the emitting surface of the cathode component 610. In some embodiments, the area of the first crystal face 613 may account for more than 80% of the area of the emitting surface of the cathode component 610. In some embodiments, the area of the first crystal face 613 may account for more than 90% of the area of the emitting surface of the cathode component 610. In some embodiments, the area of the first crystal face 613 may account for more than 95% of the area of the emitting surface of the cathode component 610. In some embodiments, the area of the first crystal face 613 may account for more than 100% of the area of the emitting surface of the cathode component 610.

In some embodiments, a user (e.g., an engineer, a manufacture, etc.) can set a desired structural parameter of the cathode component, such as at least one of a growth direction of a crystal grain, a size of the crystal grain (e.g., a length/width of the crystal grain), an internal pore size (e.g., a diameter) and distribution (e.g., a porosity) of the cathode component, an orientation of a crystal face (e.g., a proportion of the area of the first crystal face 613 to the area of the emitting surface of the cathode component 610), and then determine the predetermined parameter according to the structural parameter, such as, at least one of a scanning direction of laser, an energy distribution of laser, an output power of laser, or a scanning speed of laser.

In some embodiments, a corresponding relationship between the structural parameter and the predetermined parameter may be obtained, and then the predetermined parameter may be determined according to the structural parameter and the corresponding relationship. The corresponding relationship may be stored in a storage device in a form of a table, a curve, or the like.

In some embodiments, the predetermined parameter may be determined by a parameter determination model based on at least one of a growth direction of a crystal grain, a size of the crystal grain (e.g., a length/width of the crystal grain), an internal pore size (e.g., a diameter) and distribution (e.g., a porosity) of the cathode component, an orientation of a crystal face (e.g., a proportion of the area of the first crystal face 613 to the area of the emitting surface of the cathode component 610).

In some embodiments, the parameter determination model may include a deep neural network model. In some embodiments, the parameter determination model may include at least one of convolutional neural networks (CNN), residual networks (Res-Net), or U-Net.

In some embodiments, an input of the parameter determination model may include at least one of a growth direction of a crystal grain, a size of the crystal grain (e.g., a length/width of the crystal grain), an internal pore size (e.g., a diameter) and distribution (e.g., a porosity) of the cathode component, an orientation of a crystal face (e.g., a proportion of the area of the first crystal face 613 to the area of the emitting surface of the cathode component 610). An output of the parameter determination model may include at least one of a scanning direction of laser, an energy distribution of laser, an output power of laser, or a scanning speed of laser.

In some embodiments, the parameter determination model may be determined by training based on a plurality of training samples and labels. For example, a training sample may include at least one of a scanning direction of laser, an energy distribution of laser, an output power of laser, or a scanning speed of laser of a sample cathode component prepared by a 3D printing technique. A label may include at least one of a growth direction of a crystal grain, a size of the crystal grain (e.g., a length/width of the crystal grain), an internal pore size (e.g., a diameter) and distribution (e.g., a porosity) of the cathode component, an orientation of a crystal face (e.g., a proportion of the area of the first crystal face 613 to the area of the emitting surface of the cathode component 610).

In some embodiments, the plurality of training samples may be input into a preliminary model to obtain at least one intermediate parameter. A loss function may be determined based on the at least one intermediate parameter and data of the label. The preliminary model may be updated based on the loss function, thus the parameter determination model may be determined.

In some embodiments, the above training process may be iterated to update the parameter determination model. In some embodiments, one or more training samples may be selected in an iteration process. A selection method may be a random selection, a sequential selection, or the like. The loss function may be a mean square error (MSE) loss function, a cross entropy loss function, or any combination thereof. A parameter of the parameter determination model may be adjusted based on the loss function to reduce a difference between the at least one intermediate parameter and the data of the label. For example, by continuously adjusting the parameter of the preliminary model, a value of the loss function may be reduced or minimized.

Figure 10:
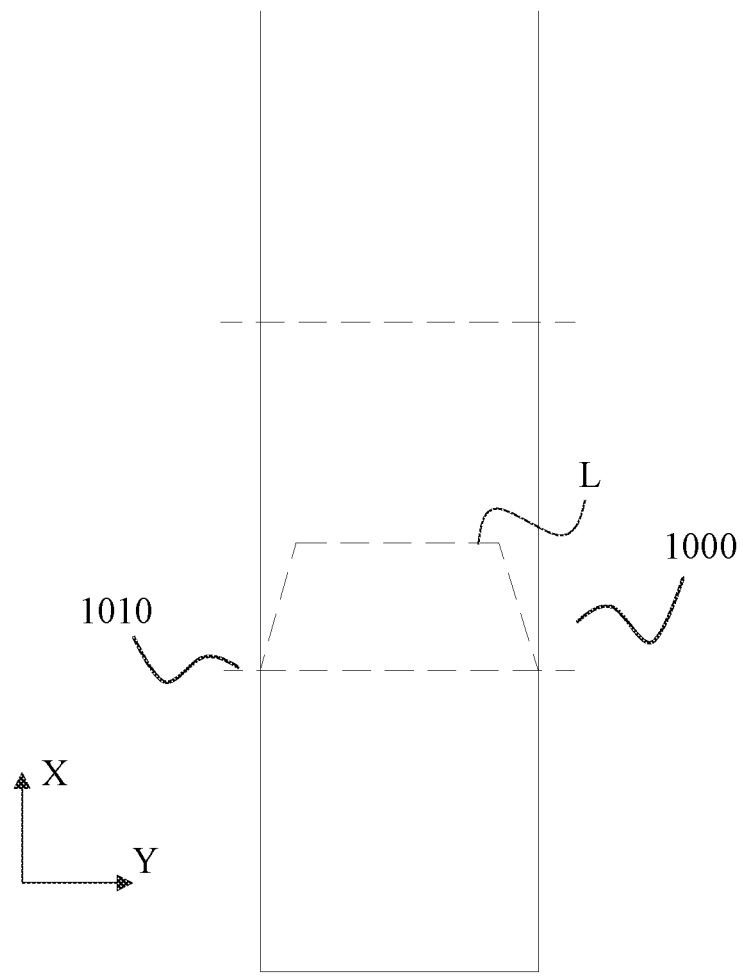
FIG. 10 is a schematic diagram illustrating an exemplary crystallization region of a cathode component according to some embodiments of the present disclosure.

FIG. 10 is a schematic diagram illustrating an exemplary crystallization region of a cathode component according to some embodiments of the present disclosure. As shown in FIG. 10, the scanning direction of laser may along the X direction.

In some embodiments, directed crystallization may mean that during a crystallization process, the melted row material may be crystallized and grown in a predetermined direction by controlling the temperature field (or the temperature gradient direction of the melted row material) of the growth of the cathode component.

In some embodiments, when the laser beam moves to a certain position of the raw material in the X direction, a certain range of the raw material may be melted to form a crystallization region (also referred to as a melted region) 1000.

In some embodiments, the crystallization region 1000 may include a crystallization front 1010. In some embodiments, the crystallization front 1010 may represent a region of nucleation and beginning of growth of the cathode component. In some embodiments, the crystallization front 1010 may be a solid-liquid boundary region between the directed crystallization region 1000 and a crystallized region.

As shown in FIG. 10, the temperature distribution of the crystallization region 1000 may be expressed as a flat-top distribution. In combination with the above descriptions, the energy distribution of laser may be adjusted to a flat-top distribution. During the laser scanning process, when the laser beam moves to a certain position of the raw material, the crystallization region 1000 may be formed, and the temperature distribution of the crystallization front 1010 of the crystallization region 1000 may be a flat-top distribution. For example, the temperature distribution of the crystallization front 1010 of the crystallization region 1000 may be similar to a curve L in FIG. 10. As shown by the curve L, the temperature gradient of the crystallization front 1010 of the crystallization region 1000 in the scanning direction (e.g., the X direction) of laser is larger than the temperature gradient in the direction perpendicular to the scanning direction (e.g., the Y direction) of laser. Therefore, the growth direction of the crystal may be parallel to the scanning direction of laser.

In some embodiments, an apparatus for preparing a cathode component (also referred to as a "3D printer") may include a substrate, a laser, and a driving mechanism for preparing a cathode component (e.g., the cathode component described above). The more descriptions of the performances of the cathode component may be found elsewhere in the present disclosure, for example, FIGS. 6-9 and the descriptions thereof, which may not be described herein.

In some embodiments, the substrate may be used to place the raw material. In some embodiments, the substrate may also be used to place a portion of formed cathode component or the completed cathode component.

In some embodiments, the laser may be used to perform a laser scanning on the raw material with the predetermined parameter based on the 3D model of the cathode component to obtain the cathode component. The more descriptions of the 3D model, the predetermined parameter, the raw material and the cathode component may be found elsewhere in the present disclosure, for example, FIGS. 5-10 and the descriptions thereof, which may not be described herein. In some embodiments, the laser may include, but be not limited to, a solid-state laser, a gas laser, a semiconductor laser, or the like.

In some embodiments, the driving mechanism may be used to drive the substrate down or drive the laser up, thus the laser beam emitted by the laser may perform a laser scanning on the raw material on the substrate or the raw material on a portion of the formed cathode component.

In some embodiments, the driving mechanism may include a power component and a driving component. The power component and the driving component may be drivingly connected. The driving component may be used to move under the driving of the power component to drive the substrate or the laser to move. In some embodiments, the power component may include a motor. In some embodiments, the driving component may be connected (e.g., fixedly connected) with the substrate or the laser. In some embodiments, the driving component may include, but be not limited to, a wire transmission mechanism, a hinge transmission mechanism, a gear rack transmission mechanism, a screw nut transmission mechanism, or the like.

The possible beneficial effects of the cathode component, the method and the apparatus for preparing the cathode component in the embodiments of the present disclosure may include, but be not limited to: (1) the method for preparing the cathode component may be simple, and easy to process and control; (2) by adjusting the predetermined parameter (e.g., a scanning direction of laser, an energy distribution of laser, an output power of laser, and a scanning speed of laser), the growth of the crystal grain of the cathode component and the orientation of the crystal face of the emitting surface may be controlled, and the performances of the cathode component may be better (e.g., a higher high temperature strength, a stronger high temperature creep resistance, a lower heat loss and a stronger electron emission ability); (3) a plurality of holes may be distributed in the cathode component, thus the area of the cross section of the cathode component may be reduced, the resistance of the cathode component may be increased, and the heat loss may be reduced on the basis of ensuring the high-temperature strength of the cathode component.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution— e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. A method for preparing a flat filament of an X-ray tube, comprising:

obtaining a three-dimensional (3D) model of the flat filament;

obtaining a predetermined parameter, wherein the predetermined parameter includes a scanning direction of laser, wherein the scanning direction of laser is perpendicular to a principal stress direction of the flat filament after the flat filament is heated and expanded during use, so that a growth direction of crystal grains of the flat filament is perpendicular to the principal stress direction of the flat filament; and controlling a 3D printer to perform, based on the 3D model and the predetermined parameter, a laser scanning on a raw material to obtain the flat filament, wherein the flat filament includes a plurality of gaps so as to define a conduction path of the flat filament in a meander form.

2. The method of claim 1, wherein the scanning direction of laser is perpendicular to a long axis direction of the flat filament.

3. The method of claim 1, wherein the predetermined parameter includes an energy distribution of laser and the energy distribution of laser is a flat-top distribution.

4. The method of claim 1, wherein the flat filament is processed by at least one of heat treating, cold working, or polishing.

5. The method of claim 1, wherein a plurality of holes are distributed inside the flat filament.

6. The method of claim 5, wherein a porosity of the flat filament is less than 20%.

7. The method of claim 1, wherein a length of a crystal grain of the flat filament is within 500 μm~1500 μm, and a width of the crystal grain of the flat filament is within 20 μm~200 μm.

8. The method of claim 1, wherein the predetermined parameter includes an output power of laser and the output power of laser is within a range of 100 mW~500 mW.

9. The method of claim 1, wherein the predetermined parameter includes a scanning speed of laser and the scanning speed of laser is within a range of 150 mm/s~2000 mm/s.

10. A system for preparing a flat filament of an X-ray tube, comprising:
  at least one storage device storing a set of instructions;
  at least one processor in communication with the at least one storage device,
wherein when executing the set of instructions, the at least one processor is directed to cause the system to perform operations including:
  obtaining a three-dimensional (3D) model of the flat filament;

obtaining a predetermined parameter, wherein the predetermined parameter includes a scanning direction of laser, wherein the scanning direction of laser is perpendicular to a principal stress direction of the flat filament after the flat filament is heated and expanded during use, so that a growth direction of crystal grains of the flat filament is perpendicular to the principal stress direction of the flat filament; and controlling a 3D printer to perform, based on the 3D model and the predetermined parameter, a laser scanning on a raw material to obtain the flat filament, wherein the flat filament includes a plurality of gaps so as to define a conduction path of the flat filament in a meander form.

11. The system of claim 10, wherein the scanning direction of laser is perpendicular to a long axis direction of the flat filament.

12. The system of claim 10, wherein the predetermined parameter includes an energy distribution of laser and the energy distribution of laser is a flat-top distribution.

13. The system of claim 10, wherein a plurality of holes are distributed inside the flat filament.

14. The system of claim 13, wherein a porosity of the flat filament is less than 20%.

15. The system of claim 10, wherein a length of a crystal grain of the flat filament is within 500 μm~1500 μm, and a width of the crystal grain of the flat filament is within 20 μm~200 μm.

16. The method of claim 1, wherein the predetermined parameter is determined by inputting a desired structural parameter of the flat filament set by a user into a trained parameter determination model, the desired structural parameter including at least one of a growth direction of a crystal grain, a size of the crystal grain, an internal pore size and distribution of the flat filament, or an orientation of a crystal face.

17. The method of claim 1, wherein an emitting surface of the flat filament includes a first crystal face which is a crystal face in which the crystal grains are preferentially grown, and an area of the first crystal face accounts for more than 50% of an area of the emitting surface of the flat filament.

18. The method of claim 5, wherein a diameter of the plurality of holes is not greater than 80 μm.

19. The method of claim 4, wherein the heat treating includes heating the flat filament above a recrystallization temperature and holding the flat filament for a predetermined time.

20. The method of claim 4, wherein the cold working includes at least one of cold rolling, cold drawing, cold forging, stamping or cold extrusion.

* * * * *